US009872050B2

United States Patent
Uhr et al.

(10) Patent No.: US 9,872,050 B2
(45) Date of Patent: Jan. 16, 2018

(54) METHOD FOR GENERATING, PROVIDING AND REPRODUCING DIGITAL CONTENTS IN CONJUNCTION WITH DIGITAL CURRENCY, AND TERMINAL AND COMPUTER READABLE RECORDING MEDIUM USING SAME

(71) Applicants: Joon Sun Uhr, Gyeonggi-do (KR); Jay Wu Hong, Seoul (KR)

(72) Inventors: Joon Sun Uhr, Gyeonggi-do (KR); Jay Wu Hong, Seoul (KR); Richard Ho Yun, Gyeonggi-do (KR)

(73) Assignees: Joon Sun Uhr, Gyeonggi-Do (KR); Jay Wu Hong, Seoul (KR)

( * ) Notice: Subject to any disclaimer, the term of this patent is extended or adjusted under 35 U.S.C. 154(b) by 0 days.

(21) Appl. No.: 15/113,090

(22) PCT Filed: Jun. 12, 2015

(86) PCT No.: PCT/KR2015/005934
§ 371 (c)(1),
(2) Date: Dec. 29, 2016

(87) PCT Pub. No.: WO2015/194798
PCT Pub. Date: Dec. 23, 2015

(65) Prior Publication Data
US 2017/0134765 A1 May 11, 2017

(30) Foreign Application Priority Data

Jun. 17, 2014 (KR) ........................ 10-2014-0073751

(51) Int. Cl.
*H04N 7/16* (2011.01)
*H04N 21/2347* (2011.01)
(Continued)

(52) U.S. Cl.
CPC ....... *H04N 21/2347* (2013.01); *G06Q 20/065* (2013.01); *G06Q 20/3829* (2013.01);
(Continued)

(58) Field of Classification Search
CPC ........... H04N 21/2347; H04N 21/4405; H04N 21/2543; H04N 21/254; H04N 21/8358;
(Continued)

(56) References Cited

U.S. PATENT DOCUMENTS

2001/0051996 A1 12/2001 Cooper et al.
2009/0125965 A1* 5/2009 Albert .............. H04N 21/23614
725/131
2016/0203572 A1* 7/2016 McConaghy ........... G06F 21/10
705/58

FOREIGN PATENT DOCUMENTS

KR 10-2007-0000378 A 1/2007
WO 01-46880 A1 6/2001

OTHER PUBLICATIONS

Skudnov, Rostislav. "Bitcoin clients." Instructor 3.12 (2012): 32, Bachelor's Thesis (UAS), Degree Program in Information Technology.

* cited by examiner

*Primary Examiner* — John Schnurr
(74) *Attorney, Agent, or Firm* — Husch Blackwell LLP

(57) ABSTRACT

A method for a content providing terminal providing at least one technically protected digital content is disclosed. The method includes steps of: (a) the content providing terminal providing the digital content in which information on a public key or pointing information indicating the information on the public key is embedded, wherein the information on the public key or the pointing information indicating the information on the public key is required to make a digital content provider receive digital money; and (b) the content
(Continued)

providing terminal supporting a course of removing a state of restriction on the use of the digital content to allow a user terminal which receives the digital content to play the digital content, if the user terminal creates payment information by using the public key and its private key and the created payment information is determined to be true.

28 Claims, 9 Drawing Sheets

(51) Int. Cl.
| | |
|---|---|
| *G06Q 20/38* | (2012.01) |
| *G06Q 20/06* | (2012.01) |
| *H04N 21/4405* | (2011.01) |
| *H04N 21/2543* | (2011.01) |
| *H04N 21/6334* | (2011.01) |
| *H04N 21/8358* | (2011.01) |
| *H04N 21/2389* | (2011.01) |
| *H04N 21/258* | (2011.01) |
| *H04N 21/4627* | (2011.01) |
| *H04N 21/254* | (2011.01) |

(52) U.S. Cl.
CPC ... *H04N 21/23892* (2013.01); *H04N 21/2541* (2013.01); *H04N 21/2543* (2013.01); *H04N 21/25816* (2013.01); *H04N 21/4405* (2013.01); *H04N 21/4627* (2013.01); *H04N 21/63345* (2013.01); *H04N 21/8358* (2013.01)

(58) Field of Classification Search
CPC ............ H04N 21/2389; H04N 21/258; H04N 21/4627; H04N 21/6334; G06Q 20/06; G06Q 20/38
See application file for complete search history.

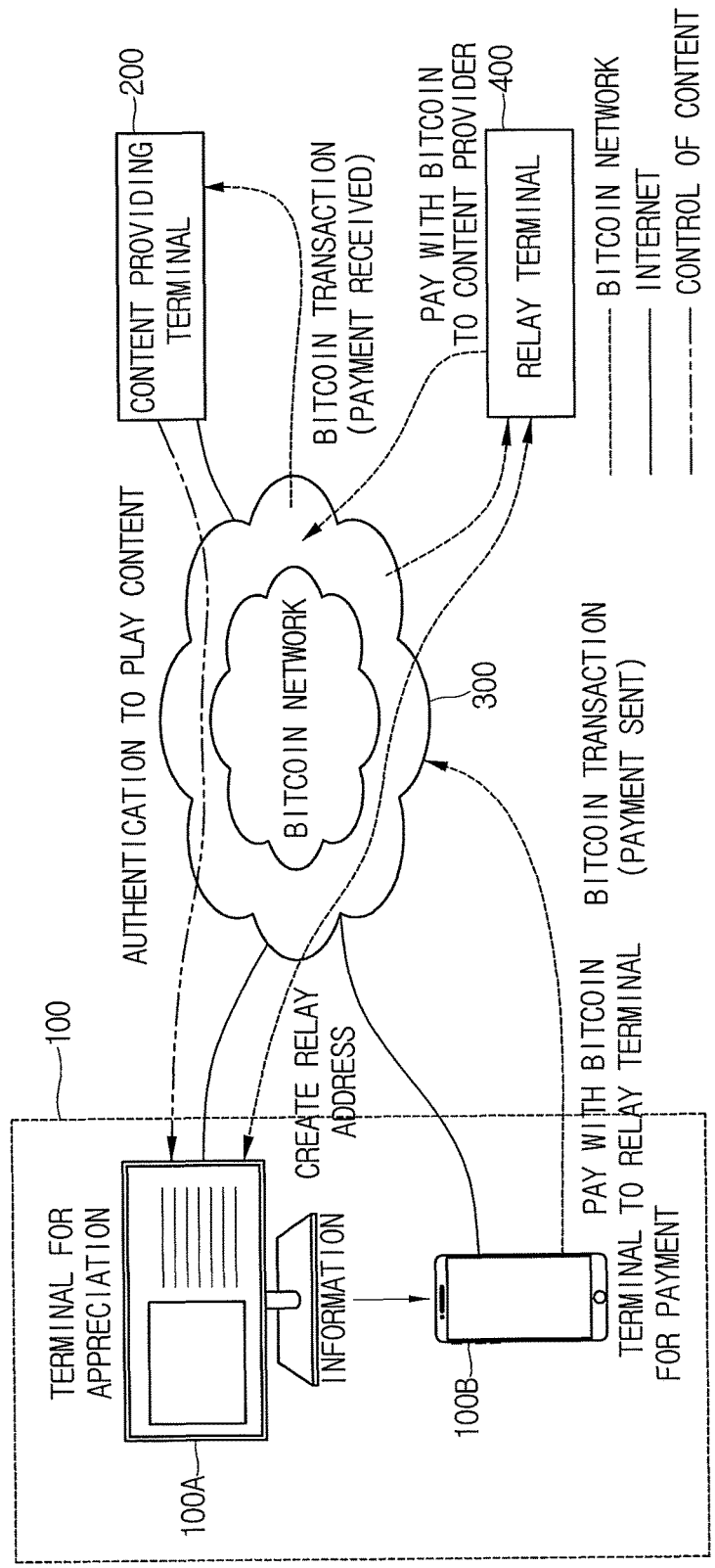

FIG. 8

```
{
    "description": {
        "title" : "test movie"
        "author" : "author name",
        ...
        "uid" : "6e441a8becbd9d21b222a9d95dc61494f3175287513b6a83fe68993c0cb94b38",
        "service provider" : "www.coinplug.com"
        "url" : "database.coinplug.com/video/",
        ...
    },
    "rights": {
        "access option" : [
            "option a" : {
                "access" : "unlimited",
                ...
            },
            "option b" : {
                "access" : "limited",
                "count" : "3":,
                "period" : "3",
                "period unit" : "day"
                ...
            }
        ...
    }
    "content payment" : {
        "digital currency" : "BTC",
        "copyright holder's public address" : [
            { "1st" : "14CALEFp26mKUuGMJLokwLzveRe8mnNSMg", "ratio": "0.7" },
            { "2nd" : "1MrbBWsPckXvmxfDbkXgapJ49Jp87X56rw", "ratio": "0.3" },
        ]
        "rates": [
            { "name": "option a", "rate" : "1.00", "currency" : "USD" },
            { "name": "option b", "rate" : "0.50", "currency" : "USD" }
        ]
    },
    ...
    "signature" : "483045022100d7ca72ce4b6fefc0f1c5e2f4290bbfe3a87a84c58cb160b96543"
                  "206ba04cd5ac02206d06a2715c33e622281e49a6394a833aad62db2b0bb337cb"
                  "17e3e33e8b41a80a01210217bf1830f03886e7f40429d532488ed424af101241"
                  "72e8f208b8766f5f5dca71"
}
```

METHOD FOR GENERATING, PROVIDING AND REPRODUCING DIGITAL CONTENTS IN CONJUNCTION WITH DIGITAL CURRENCY, AND TERMINAL AND COMPUTER READABLE RECORDING MEDIUM USING SAME

CROSS REFERENCE TO RELATED APPLICATIONS

This application is a U.S. National Phase Application of International Application No. PCT/KR2015/005934 filed on Jun. 12, 2015, which claims the benefit of priority from Korean Patent Application 10-2014-0073751 filed on Jun. 17, 2014. The disclosures of International Application No. PCT/KR2015/005934 and Korean Patent Application 10-2014-0073751 are incorporated herein by reference.

FIELD OF THE INVENTION

The present invention relates to a method for generating, providing, and playing a digital content by using digital money and a terminal and a computer readable recording medium using the same; and more particularly, to the method for creating, providing, and playing the digital content effectively by allowing a process of payment with the digital money to be simplified by inserting information on a public key into a header of the digital content, wherein the information on the public key is required to make a content provider receive the digital money such as Bitcoin, and the terminal and the computer readable recording medium using the same.

BACKGROUND OF THE INVENTION

Recently, cryptocurrencies appear one after another by using various forms of cryptography systems. For example, there are Litecoin, Peercoin, Namecoin, etc. other than Bitcoin which is the first digital money with the largest scale.

Bitcoin which was developed in January 2009 by a programmer under a pseudonym of Satoshi Nakamoto is not money used in real lives but virtual money used for online transactions. It is known that an unidentified person named Satoshi Nakamoto devised Bitcoin in 2008 against central banks in countries, which have monopolized the issuance of currencies and administered monetary policies arbitrarily. A system for administering Bitcoin allows Bitcoin to be provided in return for solving very difficult mathematical problems suggested by computer and it is provided as an open source by applying an MIT license. As computer programming code for the Bitcoin is revealed to the public just like Linux as a computer operating system, any developer may participate in programming upgrade for the Bitcoin.

A process of creating Bitcoin is called "mining" and those who get Bitcoin in the way are called "miners." Starting mining in 2009, approximately 12 million bitcoins were mined as of March 2014. When it was first designed, it was set to mine a total of 21 million bitcoins until 2145. So bitcoins will be depleted when roughly 8 million bitcoins are mined in the future. Those who are not miners may purchase bitcoins to make transactions.

Next to Bitcoin, the second best-known cryptocurrency is Litecoin. In October 2011, Charlie Lee, a former Google employee, developed the Litecoin by modifying Bitcoin. While Bitcoin becomes difficult to be mined due to the sharply increased number of participants, Litecoin has a high mining efficiency.

Peercoin was developed by a software developer Sunny King in August last year, inspired by Bitcoin. It is "eco-friendly money" system that may be mined more when the energy efficiency of computers increases.

Next to them, new currencies such as Gridcoin, Fireflycoin, and Zeuscoin have been developed. Their principles are mostly similar to Bitcoin but their values are determined by putting difference in mining system or mining speed.

The Wall Street Journal recently reported that the Bitcoin craze had spawned more than 80 virtual currencies.

However, there is a lack of effort to produce, distribute, and play digital contents by using such digital currencies.

Besides, it should be convenient for a user to pay with the digital currency for contents, but there are problems including registration of an account, an exposure of private information, etc. for the payment of the digital currency and it has drawbacks in that the user must provide personal information to a variety of individual content providers to consume the contents.

SUMMARY OF THE INVENTION

It is an object of the present invention to solve all the aforementioned problems.

It is another object of the present invention to implement a new distribution platform based on at least one digital content with a new format by inserting information on digital money such as Bitcoin into a header of a digital content and thereby creating the digital content with a new format.

It is still another object of the present invention to reasonably protect a copyright holder's right and interest by inserting the information on the digital money such as Bitcoin into the header of the digital content and thereby distributing the digital content with a new format.

It is still yet another object of the present invention to facilitate activation of the digital money such as Bitcoin by inserting the information on the digital money such as Bitcoin into the header of the digital content and then allowing the digital content with a new format to be played through a player.

It is still yet another object of the present invention to contribute to activation of the digital contents by allowing users to consume the digital contents under a simple payment method.

It is still yet another object of the present invention to allow even groups or devices, including a TV set, a broadcasting company, or a CDN where contents are delivered and expressed at an intermediate stage, to monitor payment status and share profits.

It is still yet another object of the present invention to allow a user to make payment in an identical way regardless of content providers without having to create an account for the payment.

It is still yet another object of the present invention to distribute contents without any individual contracts through a unique payment method and allow not only large content providers but also individuals to sell their contents without any distribution channel.

In accordance with one aspect of the present invention, there is provided a method for a content providing terminal providing at least one technically protected digital content, including steps of: (a) the content providing terminal providing the digital content in which information on a public key or pointing information indicating the information on the public key is embedded, wherein the information on the public key or the pointing information indicating the information on the public key is required to make a digital content provider receive digital money; and (b) the content providing terminal supporting a course of removing a state of restriction on the use of the digital content to allow a user terminal which receives the digital content to play the digital content, if the user terminal creates payment information by using the public key and its private key and the created payment information is determined to be true.

In accordance with another aspect of the present invention, there is provided a method for a user terminal playing at least one technically protected digital content, including steps of: (a) the user terminal acquiring information on the digital content in which information on a public key or pointing information indicating the information on the public key is embedded; (b) the user terminal creating payment information by using the public key and its private key; and (c) the user terminal receiving a support to remove a state of restriction on the use of the digital content from a content providing terminal to thereby allow a user of the user terminal to play the digital content if the payment information is determined to be true.

In accordance with still another aspect of the present invention, there is provided a method for a content creating terminal creating at least one technically protected digital content, including steps of: (a) the content creating terminal embedding information on a public key or pointing information indicating the information on the public key in the digital content, wherein the information on the public key or the pointing information indicating the information on the public key is required to make a digital content provider receive digital money; and (b) the content creating terminal supporting to remove a state of restriction on the use of the digital content to allow the digital content to be played through a user terminal if a fact that a specified condition related to the embedded information on the public key has been satisfied is detected from the user terminal, wherein the digital content in which the information on the public key is embedded is acquired by the user terminal and payment information is created by using the public key and a private key of the user terminal, and wherein the specified condition includes a condition that the payment information is true.

In accordance with still yet another aspect of the present invention, there is provided a content providing terminal for providing at least one technically protected digital content, including: a digital content information managing part for providing the digital content in which information on a public key or pointing information indicating the information on the public key is embedded, wherein the information on the public key or the pointing information indicating the information on the public key is required to make a digital content provider receive digital money; and a play managing part for supporting a course of removing a state of restriction on the use of the digital content to allow a user terminal which receives the digital content to play the digital content, if the user terminal creates payment information by using the public key and its private key and the created payment information is determined to be true.

In accordance with still yet another aspect of the present invention, there is provided a user terminal for playing at least one technically protected digital content, including: a metadata acquiring part for acquiring information on the digital content in which information on a public key or pointing information indicating the information on the public key is embedded, wherein the information on the public key or the pointing information indicating the information on the public key is required to make a digital content provider receive digital money; a payment information managing part for creating payment information by using the public key and a private key of the user terminal; and a play managing part for receiving a support to remove a state of restriction on the use of the digital content from a content providing terminal to thereby allow a user of the user terminal to play the digital content if the payment information is determined to be true.

In accordance with still yet another aspect of the present invention, there is provided a content creating terminal for creating at least one digital content, including: a public key information inserting part for embedding information on a public key or pointing information indicating the information on the public key in the digital content, wherein the information on the public key or the pointing information indicating the information on the public key is required to make a digital content provider receive digital money; and a licensing part for supporting to remove a state of restriction on the use of the digital content to allow the digital content to be played through a user terminal if a fact that a specified condition related to the embedded information on the public key has been satisfied is detected from the user terminal, wherein the digital content in which the information on the public key is embedded is acquired by the user terminal and payment information is created by using the public key and a private key of the user terminal, and wherein the specified condition includes a condition that the payment information is true.

BRIEF DESCRIPTION OF THE DRAWINGS

The above and other objects and features of the present invention will become apparent from the following description of preferred embodiments given in conjunction with the accompanying drawings, in which:

FIG. 7 illustrates interactions between the user terminal and the content providing terminal in accordance with still yet another example embodiment of the present invention.

FIG. 8 illustrates examples of metadata format embedded in the digital content in accordance with the present invention.

DETAILED DESCRIPTION OF THE PREFERRED EMBODIMENTS

Figure 1:
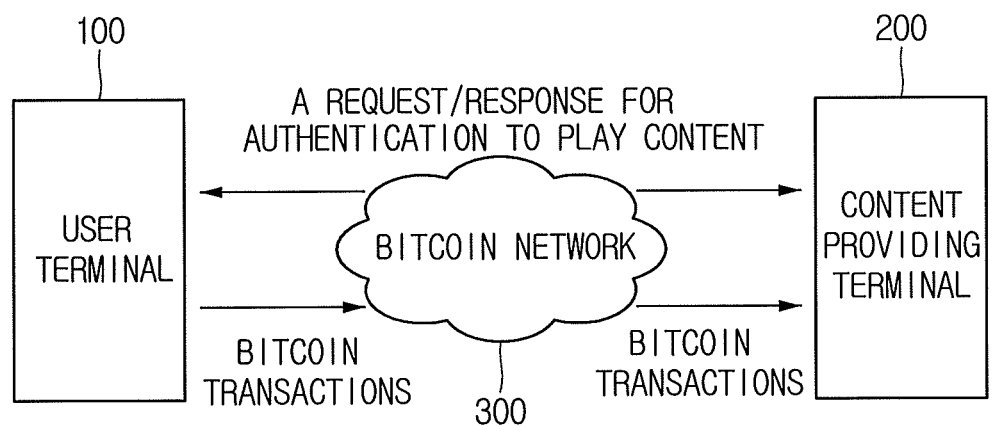
FIG. 1 is a configuration diagram illustrating overall interactions between a user terminal and a content providing terminal in accordance with one example embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as shown below.

For reference, a digital currency, i.e., a digital money, in the present invention represents a virtual currency or a means for exchange electronically created and stored. The detailed explanation herein will be made with Bitcoin as an example, but the present invention is not limited to this. It would be sure that it may be applied to similar forms of digital currencies.

In addition, a digital content mentioned in the present invention must be a concept including, but not limited to, video, audio, an e-book content, and an image and must be construed as a wide concept including other similar contents.

FIG. 1 is a configuration diagram illustrating overall interactions between a user terminal and a content providing terminal in accordance with one example embodiment of the present invention.

By referring to FIG. 1, it can be found out that the user terminal 100 requests a content providing terminal 200 to give authentication for playing a content and then the content providing terminal 200 provides a response to the request. To make the content providing terminal 200 provide an appropriate response, a Bitcoin transaction must be made between the user terminal 100 and the content providing terminal 200 through a Bitcoin network 300. More detailed explanation will be given by referring to FIGS. 2 and 3.

Figure 2:
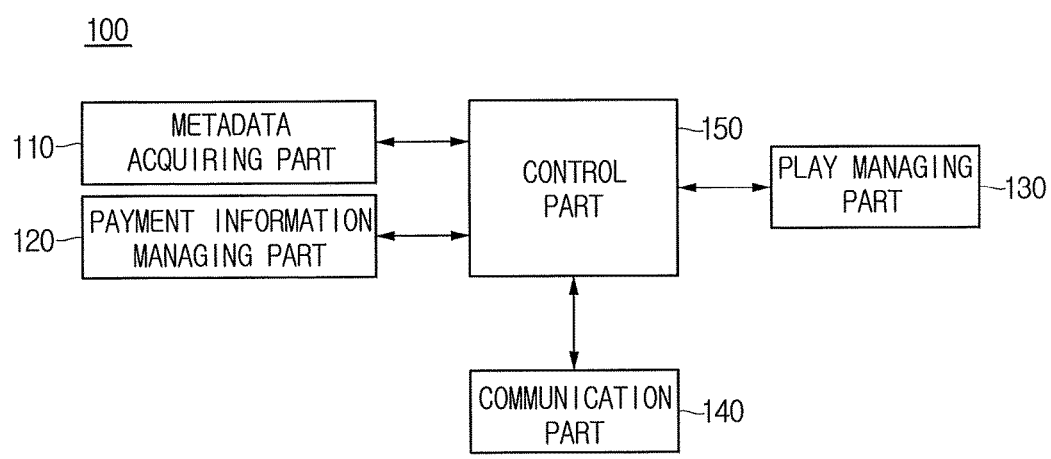
FIG. 2 shows a configuration of the user terminal in accordance with the present invention.

FIG. 2 shows a configuration of the user terminal 100 in accordance with the present invention.

Herein, the user terminal 100 is a digital device including a function of being capable of communicating and another device after accessing a communication network as a concept including all devices such as a TV set, a smartphone, a PDA, a personal computer (e.g., a tablet PC, a laptop, etc.), and a web pad.

The user terminal 100 may perform a function of playing a technically protected digital content and paying certain bitcoins. Accordingly, the user terminal 100 may include a device which may recognize the Bitcoin protocol.

By referring to FIG. 2, the user terminal 100 in accordance with one example embodiment of the present invention may include a metadata acquiring part 110, a payment information managing part 120, a play managing part 130, a communication part 140, and a control part 150. In accordance with one example embodiment of the present invention, at least some of the metadata acquiring part 110, the payment information managing part 120, the play managing part 130, the communication part 140, and the control part 150 may be program modules communicating with the user terminal 100. Such program modules may be included in the user terminal 100 in forms of an operating system, an application program module, and other program module or may be physically stored in various storage devices well known to those skilled in the art. In addition, such program modules may be also stored in a remote storage device capable of communicating with the user terminal 100. Such program modules may include but not be subject to a routine, a subroutine, a program, an object, a component, and a data structure for executing a specific operation or a type of specific abstract data that will be described in accordance with the present invention.

First of all, in accordance with one example embodiment of the present invention, the metadata acquiring part 110 may perform a function of acquiring a digital content, in which information on a public key required to make a digital content provider (i.e., a copyright holder or a distributor) receive, bitcoins or pointing information indicating the information on the public key, and/or information on an access option (i.e., whether it is rent or purchased) is embedded, and then extracting the information on the public key from the acquired digital content. For reference, the information on the access option is not absolutely necessary. The reason is that a service may also be provided only on the assumption of complete purchase in bulk.

Besides, the payment information managing part 120 may perform a function of creating payment information by using the public key required to make the service provider receive the bitcoins and a private key of the user terminal and then managing the payment information.

More specifically, the payment information managing part 120 may perform a function of creating payment information by digitally signing in use of the information on the private key of the user terminal 100 after acquiring the information on the public key extracted from the acquired digital content and information on bitcoins owned by a user who holds the user terminal 100.

Herein, for example, if metadata including the information on the public key, the information on the access option, etc. embedded in the digital content in a form of watermark are extracted, the extracted metadata can be shown to a user in a human readable form to thereby lead the user to create the payment information.

More specifically, after the information on the public key extracted from the acquired digital content is added to a hash value of the bitcoins owned by the user who holds the user terminal 100, the payment information managing part 120 may perform a function of creating the payment information by digitally signing in use of the information on the private key of the user terminal 100 and creating new bitcoins.

For reference, the payment information may further include additional information other than the information on the public key. For example, the number of bitcoins, the information on the access option, ID of the user terminal, other customer-related information, etc. may be further included as the additional information.

As such, if the payment information is created, the payment information managing part 120 may go through a course of broadcasting the payment information to multiple other terminals and receiving information on verification as to whether the payment information is true or not from the multiple other terminals. Herein, if the payment information is determined to be true by at least some of the multiple other terminals, the bitcoin transaction may be allowed to be recorded in public database, which is a so-called block chain.

If the payment information is determined to be true through the aforementioned course, a play managing part 130 may receive a support to remove a state of restriction on the use of the digital content from the content providing terminal 200 to thereby allow the user to play the digital content.

In accordance with one example embodiment of the present invention, the communication part 140 performs a function of allowing the user terminal 100 to communicate with an external system such as the content providing terminal 200.

Finally, in accordance with one example embodiment of the present invention, the control part 150 performs a function of controlling the flow of data among the metadata acquiring part 110, the payment information managing part 120, the play managing part 130, and the communication part 140. In other words, the control part 150 controls the metadata acquiring part 110, the payment information managing part 120, the play managing part 130, and the communication part 140 to perform their respective unique functions by controlling the flow of the data among components of the user terminal 100 or from or to the outside.

Figure 3:
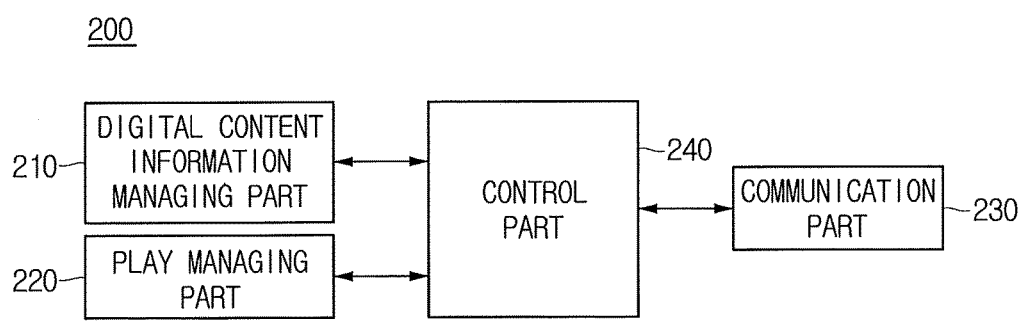
FIG. 3 illustrates a configuration of the content providing terminal in accordance with the present invention.

FIG. 3 illustrates a configuration of the content providing terminal 200 in accordance with the present invention.

Herein, the content providing terminal 200 as a digital device capable of communicating after accessing a communication network may include a content providing server but it is not limited to this. It may also include a smartphone, a PDA, a personal computer (e.g., tablet PC, laptop, etc.), web pad, etc. Such device may be paired with the user terminal 100 with which a P2P service is also available. Additionally, the content providing terminal 200 may perform a function of providing the technically protected digital content(s).

By referring to FIG. 2, the content providing terminal 200 in accordance with one example embodiment of the present invention may be a digital content information managing part 210, a play managing part 220, a communication part 230, and a control part 240. In accordance with one example embodiment of the present invention, at least some of the digital content information managing part 210, the play managing part 220, the communication part 230 and the control part 240 may be program modules communicating with the content providing terminal 200. Such program modules may be included in the content providing terminal 200 in forms of an operating system, an application program module, and other program module or may be physically stored in various storage devices well known to those skilled in the art. In addition, such program modules may be also stored in a remote storage device capable of communicating with the content providing terminal 200. Such modules may include but not be subject to a routine, a subroutine, a program, an object, a component, and a data structure for executing a specific operation or a type of specific abstract data that will be described in accordance with the present invention.

First of all, the digital content information managing part 210 in accordance with one example embodiment of the present invention may perform a function of providing information on a digital content in which information on a public key required to make a digital content provider (i.e., a copyright holder or a distributor) receive bitcoins or pointing information indicating the information on the public key, and/or information on an access option (i.e., whether it is rent or purchased) is embedded.

For example, the digital content information managing part 210 may manage and provide the information on the public key, etc. by embedding the information on the public key, etc. in the digital content in a form of watermark but it is not limited to the form of watermark.

As such, there may be a variety of pieces of information embedded in the digital content, which is managed by the digital content information managing part 210. For instance, FIG. 8 illustrates examples of formats of metadata embedded in the digital content in accordance with the present invention. For reference, it is made sure that all metadata of the digital content as illustrated in FIG. 8 are not necessary to be included but the metadata possible to be embedded are exemplarily shown.

By referring to FIG. 8, "description", "rights", "content payment", and "signature" sections as metadata sections are illustrated. To put it concretely, the "description" section may include a "title" field representing a title of a content, an "author" field representing a name of an author, an "uid" field representing a unique ID of the content, a "service provider" field showing a name of a service provider, an "url" field to access information on the content, etc.

Besides, the "rights" section may include an "access option" field representing an access option of the digital content (e.g., whether it is borrowed for a certain period of time or completely purchased), an "option name" field representing a name of the option, an "access" field showing an access type (distinguished by whether it is limited or unlimited), a "count" field to specify count if it is the limited type, a "period" field to specify an access period, a "period unit" field to specify the access period in a unit of minute, hour, day, week, month and year, etc.

Besides, the "content payment" section may include a "digital currency" field representing a type of payable digital money, a "copyright holder information" field representing information on a copyright holder, a "name":"addr" field showing a name of the copyright holder and an address of the digital money (where the "addr" part after the colon represents the public key corresponding to the address required to make the content service provider receive the bitcoins), a "ratio":"{number}" field representing a ratio of receiving the digital money (if there are multiple copyright holders or if a copyrighter and a distributor share profits, a profit-sharing percentage is set by such field), a "rates" field representing rates fixed by access option, etc.

The "signature" section means an electronic signature of a copyright holder or a distribution right holder with respect to a hash value of the digital content in which the "description", "rights", and "content payment" sections are embedded. This plays a role in allowing the digital content to be recognized as true. In short, it can be checked whether the electronic signature is true or not by using a public key for authentication (which is not a public key corresponding to an address required to make the digital content provider receive bitcoins but a public key to confirm whether the digital content is true) extracted from a certificate of a service provider, later.

Besides, if the user terminal 100 that has received the digital content creates payment information in use of (i) the public key corresponding to the address required to make the digital content provider receive the bitcoins and (ii) the private key of the user terminal 100 and if the payment information is determined to be true, the play managing part 220 may perform a function of supporting a course of removing a state of restriction on the use of the digital content to allow the user terminal 100 to play the digital content.

In accordance with one example embodiment of the present invention, the communication part 230 performs a function of allowing the content providing terminal 200 to communicate with an external system such as the user terminal 100.

Finally, in accordance with one example embodiment of the present invention, the control part 240 performs a function of controlling the flow of data among the digital content information managing part 210, the play managing part 220, and the communication part 230.

In short, the control part 240 controls the digital content information managing part 210, the play managing part 220, and the communication part 230 to perform their individual unique functions by controlling the flow of the data among components of the content providing terminal 200 or from or to the outside.

A terminal for creating a digital content has not been illustrated in the present invention, but it may exist in accordance with the present invention. The terminal for creating the digital content may include a public key information inserting part for embedding information on a public key or pointing information indicating the information on the public key in the digital content, wherein the information on the public key or the pointing information indicating the information on the public key is required to make a digital content provider receive digital money; and a licensing part for allowing a user of the user terminal 100 to watch the digital content if a fact that a specified condition related to the embedded information on the public key has been satisfied is detected from the user terminal 100, wherein the specified condition includes a condition that the above-described payment information is true.

By referring to FIGS. 4 to 7, explanation is made on assumption that kinds of the user terminal 100 in accordance with the present invention may include a terminal 100A for appreciation and a terminal 100B for payment, but it is not limited thereto. Herein, the terminal 100A for appreciation is a terminal for playing the digital content and the terminal 100B for payment is a terminal for transmitting the payment information directly or indirectly to the content providing terminal 200. Specifically, the terminal 100A for appreciation may include an exclusive device including one of TV, OTT, or STB or a device that provides web-based services, wherein examples of the web-based services could be introduced as youtube, hulu, etc. Besides, such exclusive device or the device that provides web-based services should have the ability to recognize watermark as necessary and to extract metadata to thereby create the payment information. In addition, such exclusive device or the device that provides web-based services may monitor information on a bitcoin transaction to determine as to whether a condition of the content provider for providing the digital content is satisfied, and be allowed to consume the digital content if it satisfies the condition.

Even though not being expressly indicated in the drawings, even a distribution channel may recognize Bitcoin. For example, CDN, ISP, etc. may monitor the transmission status and the payment status with respect to the digital content.

Figure 4:
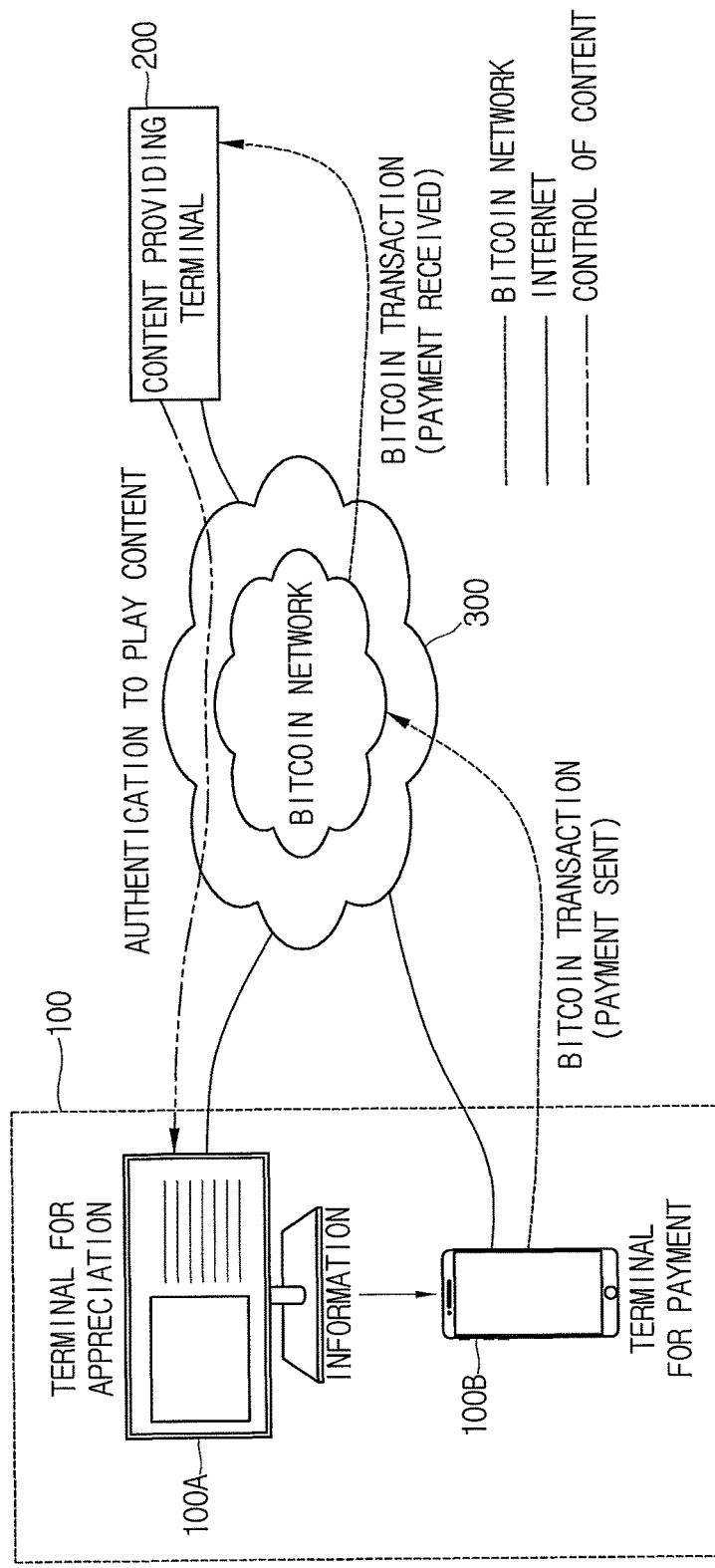
FIG. 4 shows interactions between the user terminal and the content providing terminal in accordance with one example embodiment of the present invention.

FIG. 4 shows interactions between the user terminal and the content providing terminal in accordance with one example embodiment of the present invention.

By referring to FIG. 4, the metadata, e.g., information on the public key and the access option, extracted by the terminal 100A for appreciation are displayed in the human readable form and then, if a user's selection is detected, the payment information may be created by using the information on the public key and the private key of the terminal 100A for appreciation. Herein, the information on the public key corresponds to the address to which the bitcoins are received. The payment information may be provided to the terminal 100B for payment by using Bitcoin QR codes, Bluetooth beacons, Wi-Fi beacons, NFC, etc. and the terminal 100B for payment may transmit the payment information through the Bitcoin network 300. Accordingly, the content providing terminal 200 could receive the payment information.

Figure 5:
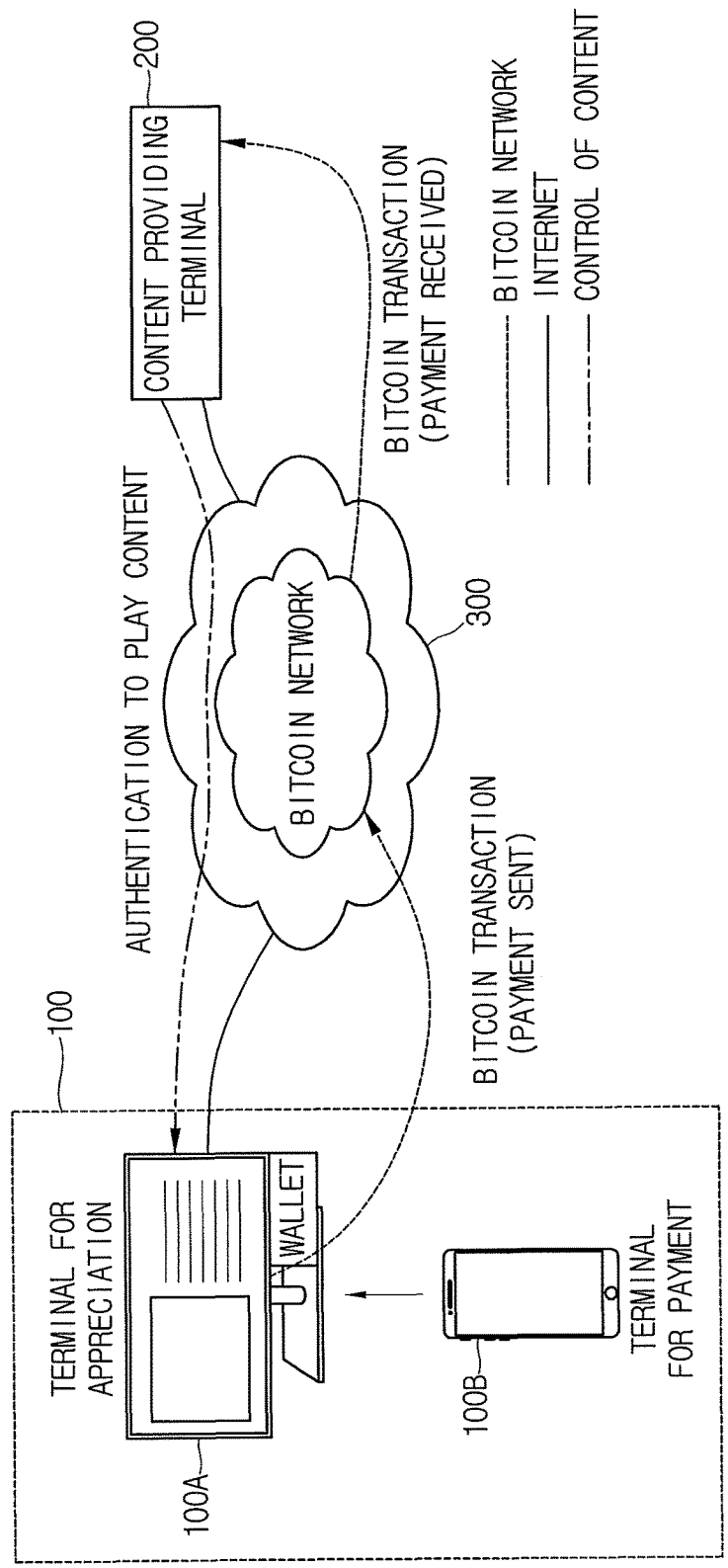
FIG. 5 represents interactions between the user terminal and the content providing terminal in accordance with another example embodiment of the present invention.

FIG. 5 represents interactions between the user terminal and the content providing terminal in accordance with another example embodiment of the present invention.

By referring to FIG. 5, on condition that a wallet for Bitcoin is set to the terminal 100A for appreciation and the bitcoins are deposited in the wallet, if a certain amount of bitcoins corresponding to the digital content among all the bitcoins deposited in the wallet is transmitted to the address indicated by the information on the public key through control of the terminal 100B for payment or the terminal 100A for appreciation itself, the content providing terminal 200 could receive the payment information. Herein, when the certain amount of bitcoins corresponding to the digital content among all the bitcoins deposited in the wallet is transmitted to the address indicated by the information on the public key, information on an ID of the terminal 100A for appreciation may be transmitted together.

Figure 6:
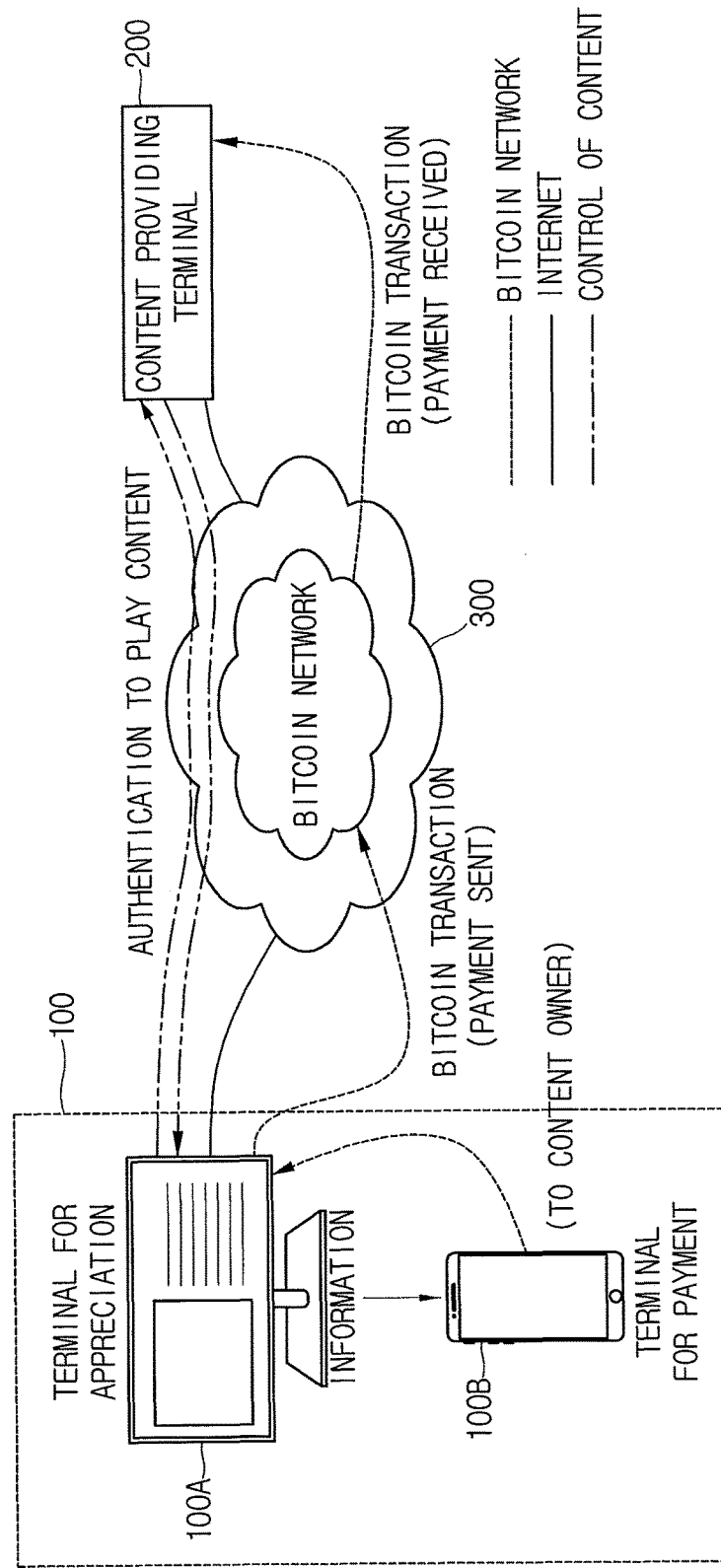
FIG. 6 shows interactions between the user terminal and the content providing terminal in accordance with still another example embodiment of the present invention.

FIG. 6 shows interactions between the user terminal and the content providing terminal in accordance with still another example embodiment of the present invention.

By referring to FIG. 6, the metadata, e.g., information on the public key and the access option, extracted by the terminal 100A for appreciation are displayed in the human readable form and then, if a user's selection is detected, the payment information may be created by using the information on the public key and the private key of the terminal 100A for appreciation. Herein, the information on the public key corresponds to the address to which the bitcoins are received. The payment information may be provided to the terminal 100B for payment by using Bitcoin QR codes, Bluetooth beacons, Wi-Fi beacons, NFC, etc. If the terminal 100B for payment requests the terminal 100A for appreciation to transmit the payment information to the content providing terminal 200, the terminal 100A for appreciation may transmit and notify the payment information to the content providing terminal 200 and then the content providing terminal 200 may authenticate the payment information after receiving it.

FIG. 7 illustrates interactions between the user terminal and the content providing terminal in accordance with still yet another example embodiment of the present invention.

By referring to FIG. 7, the metadata, e.g., information on the public key and the access option, extracted by the terminal 100A for appreciation are displayed in the human readable form and then, if a user's selection is detected, the payment information may be created by using the information on the public key and the private key of the terminal 100A for appreciation. Herein, an address indicated by the information on the public key is different from an address of the content providing terminal. Then, the created Payment information may be provided to the terminal 100B for payment. By referring to the payment information, if the terminal 100B for payment transmits the payment information to a relay terminal 400 corresponding to the address indicated by the information on the public key directly or indirectly, the relay terminal 400 that have received the payment information may transmit the payment information to the content providing terminal 200. Accordingly, the content providing terminal 200 may receive the payment information.

Figure 9:
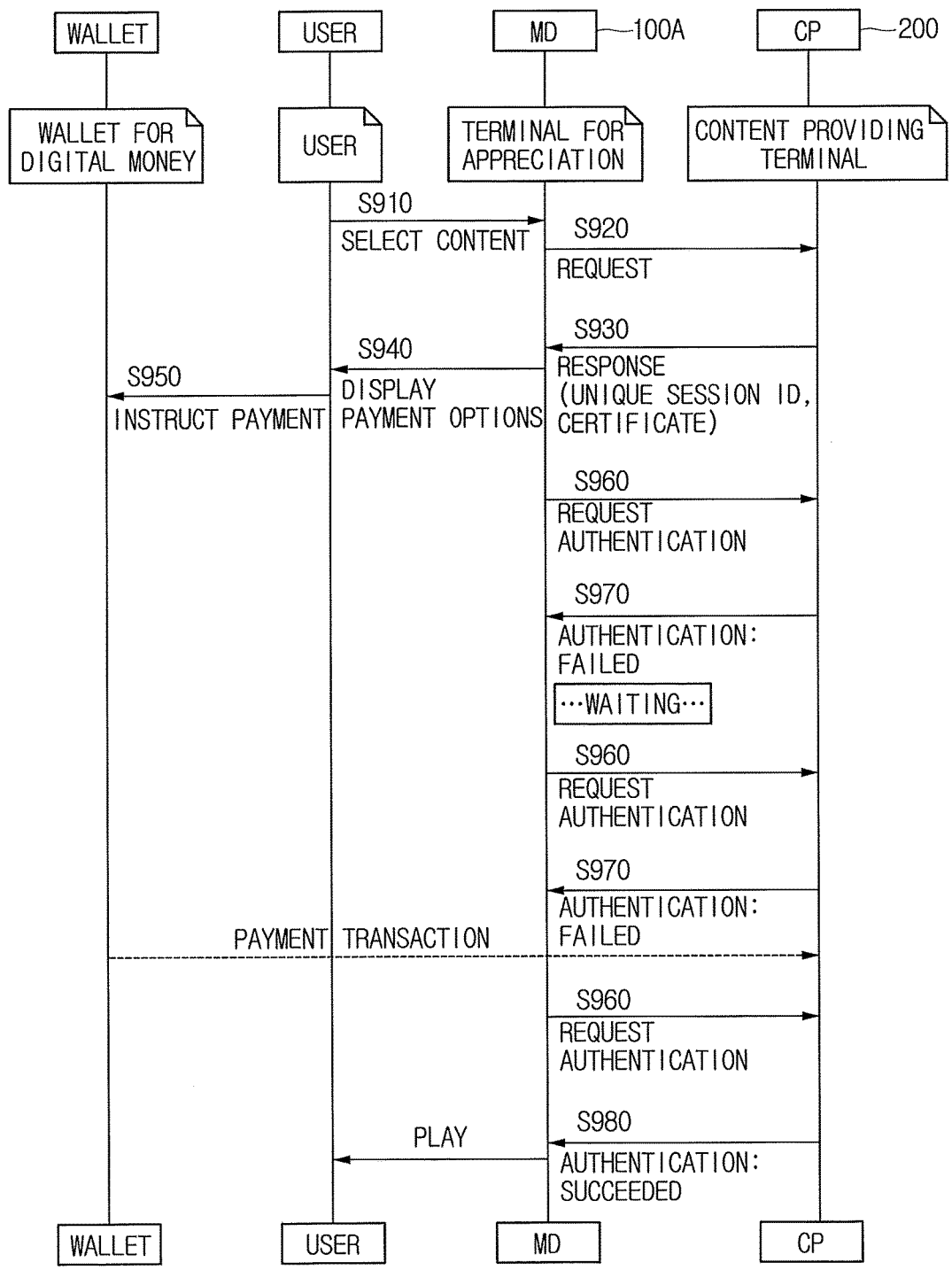
FIG. 9 is a drawing illustrating a full course of transmitting and receiving a message until the user terminal is successfully authenticated.

FIG. 9 is a drawing illustrating a full course of transmitting and receiving a message until the user terminal is successfully authenticated.

In FIG. 9, it is assumed that the wallet for Bitcoin is installed at the terminal 100A for appreciation.

If a user of the terminal 100A for appreciation requests the play of the digital content in which the metadata are embedded, the payment with Bitcoin may be made in the following steps:

First of all, the digital content in which metadata are embedded in a JSON format or a similar format is loaded on the terminal 100A for appreciation.

Besides, if the digital content loaded on the terminal 100A for appreciation is selected by the user at a step of S910, the metadata are extracted and parsed. The terminal 100A for appreciation sends a request for commencing a connection to the content providing terminal 200 at a step of S920, and receives a response to the request from the content providing terminal 200 at a step of S930. The response may include a unique session ID, and a certificate. Herein, the certificate is to verify that the digital content belongs to the true right holder, and may include the public key for authentication. Herein, the public key for authentication is not a concept of an address required to make the content provider receive Bitcoin but a concept used to determine whether the true right holder has electronically signed or not.

Next, the terminal 100A for appreciation may display various payment options to the user at a step of S940, and if a specified option is selected among all the payment options displayed through a screen of the terminal 100A for appreciation, instructions to pay with bitcoins may be delivered to the wallet at a step of S950.

Until it is detected that the payment to the content providing terminal 200 has been completed, the terminal 100A for appreciation may send a request for authentication regularly to the content providing terminal 200 at a step of S960 and if the payment has not been completed, the content providing terminal 200 may transmit a response indicating that the authentication has failed at a step of S970. If the payment has been completed, the content providing terminal 200 may transmit a response indicating that the authentication has succeeded at a step of S980.

For reference, the explanation has been made on the assumption that the terminal 100A for appreciation is considered in FIG. 9, but it is not limited to this. For example, the user terminal 100 may also be considered.

In accordance with the present invention, a new distribution platform may be implemented based on at least one digital content with a new format by inserting information on digital money such as Bitcoin into a header of a digital content and then creating the digital content with a new format.

In addition, the present invention may reasonably protect a copyright holder's right and interest by inserting information on digital money such as Bitcoin into the header of the digital content and then distributing the digital content with a new format.

Furthermore, the present invention may facilitate activation of the digital money such as Bitcoin by inserting the information on the digital money such as Bitcoin into the header of the digital content and then allowing the digital content with a new format to be played through a player.

Moreover, the present invention may contribute to activation of the digital contents because users can consume the digital contents under a simple payment method.

Additionally, the present invention may allow even groups or devices, including a TV set, a broadcasting company, or a CDN where contents are delivered and expressed at an intermediate stage, to monitor payment status and share profits.

Also, the present invention may allow a user to make payment under an identical payment method regardless of content providers without having to create an account for payment.

Besides, the present invention may distribute contents without any individual contracts through a unique payment method and allow not only large content providers but also individuals to sell their contents without any distribution channel.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for a content providing terminal providing at least one technically protected digital content, comprising steps of:
(a) the content providing terminal providing the digital content in which (i) information on a public key or (ii) pointing information indicating the information on the public key is embedded, wherein the information on the public key or the pointing information is required for a digital content provider to receive digital money; and
(b) upon receipt of payment information created by a user terminal using (i) the public key associated with the digital content and (ii) a private key of the user terminal, and upon determination that the created payment information is valid, the content providing terminal supporting removal of a state of restriction on the use of the digital content to allow the user terminal to play the digital content;

wherein the payment information is created by digitally signing in use of the information on the private key of the user terminal after acquiring the information on the public key embedded in the digital content and information on digital money owned by a user who holds the user terminal;

wherein upon creation of the payment information, the user terminal broadcasts the payment information to multiple other terminals, and receives from the multiple other terminals information on verification as to whether the payment information is true or not; and wherein upon determination that the payment information is true from at least some of the multiple other terminals, a digital money transaction is allowed to be recorded in public database.

2. The method of claim 1, wherein, at the step of (b), the payment information is created by using the digital signature with the information on the private key of the user terminal and thereby creating a new digital money while the information on the public key extracted from the information embedded in the provided digital content is added to a hash value of the digital money owned by the user who holds the user terminal.

3. The method of claim 1, wherein the content providing terminal manages the information on the public key by embedding the information on the public key in the digital content in a form of watermark.

4. The method of claim 1, wherein the user terminal includes a terminal for appreciation as one for playing the digital content and a terminal for payment as one for transmitting the payment information directly or indirectly to the content providing terminal.

5. The method of claim 4, wherein the terminal for appreciation includes an exclusive device including one of TV, OTT, or STB or a device that provides web-based services.

6. The method of claim 4, wherein, if the payment information created by using the information on the public key extracted by the terminal for appreciation is transmitted to the content providing terminal by the terminal for payment, the content providing terminal receives the payment information.

7. The method of claim 4, wherein, on the condition that a wallet for digital money is installed at the terminal for appreciation and the digital money is deposited in the wallet, if a certain amount corresponding to the digital content among the digital money deposited in the wallet is transmitted to an address indicated by the information on the public key through control of the terminal for payment or the terminal for appreciation, the content providing terminal receives the payment information.

8. The method of claim 4, wherein, if the terminal for payment requests the terminal for appreciation to transmit to the content providing terminal the payment information created by using the information on the public key extracted by the terminal for appreciation, the content providing terminal receives the payment information.

9. The method of claim 4, wherein, if the information on the public key extracted by the terminal for appreciation is provided to the terminal for payment and the terminal for payment transmits the payment information directly or indirectly to an address, indicated by the information on the public key, which is set to be different from an address of the content providing terminal, a certain terminal, corresponding to the address indicated by the information on the public key, which receives the payment information, allows the payment information to be transmitted to the content providing terminal and accordingly the content providing terminal receives the payment information.

10. The method of claim 1, wherein information on access options is additionally embedded in the digital content.

11. The method of claim 1, wherein pointing information indicating copyright information in block chain is additionally embedded in the digital content.

12. The method of claim 1, wherein the information on the public key is inserted in a header of the digital content.

13. The method of claim 1, wherein, if a specific digital content is selected by the user terminal and the content providing terminal receives a request for connecting with the specific digital content from the user terminal, the content providing terminal allows the user terminal to confirm that the specific digital content belongs to a true right holder by providing a session ID and a certificate as a response to the request to the user terminal.

14. The method of claim 13, wherein information on a digital signature of the right holder of the specific digital content is included in metadata of the specific digital content in order to allow the user terminal to confirm that the specific digital content belongs to the true right holder.

15. A non-transitory medium recording a computer readable program to execute the method of claim 1.

16. A method for a user terminal playing at least one technically protected digital content, comprising steps of:
(a) the user terminal acquiring information on the digital content in which (i) information on a public key or (ii) pointing information indicating the information on the public key is embedded, wherein the information on the public key or the pointing information is required for a digital content provider to receive digital money;
(b) the user terminal creating payment information by using the public key and its private key; and
(c) upon determining that the payment information is true, the user terminal receiving a support to remove a state of restriction on the use of the digital content from a content providing terminal to thereby allow a user of the user terminal to play the digital content;

wherein the payment information is created by digitally signing in use of the information on the private key of the user terminal after acquiring the information on the public key embedded in the digital content and information on digital money owned by a user who holds the user terminal; and wherein upon creation of the payment information, the user terminal broadcasts the payment information to multiple other terminals, and receives from the multiple other terminals information on verification as to whether the payment information is true or not.

17. The method of claim 16, wherein, at the step of (b), the payment information is created by using the digital signature with the information on the private key of the user terminal and thereby creating a new digital money while the information on the public key extracted from the information embedded in the provided digital content is added to a hash value of the digital money owned by the user who holds the user terminal.

18. A method for a content creating terminal creating at least one technically protected digital content, comprising steps of:
(a) the content creating terminal embedding, in the digital content, (i) information on a public key or (ii) pointing information indicating the information on the public key, wherein the information on the public key or the pointing information is required for a digital content provider to receive digital money; and (b) upon detecting from the user terminal that a specific condition has been satisfied relating to embedded information on the public key, the content creating terminal supporting removal of a state of restriction on the use of the digital content to allow the digital content to be played through a user terminal, wherein the digital content in which the information on the public key is embedded is acquired by the user terminal and payment information is created by digitally signing in use of the information on the private key of the user terminal after acquiring the information on the public key embedded in the digital content and information on digital money owned by a user who holds the user terminal;

wherein the specified condition includes a condition that the payment information is true;

wherein upon creation of the payment information, the user terminal broadcasts the payment information to multiple other terminals, and receives from the multiple other terminals information on verification as to whether the payment information is true or not; and wherein upon determination that the payment information is true from at least some of the multiple other terminals, a digital money transaction is allowed to be recorded in public database.

19. A content providing terminal for providing at least one technically protected digital content, comprising:

a digital content information managing part embodied as one or more processors, the digital content information managing part for providing the digital content in which (i) information on a public key or (ii) pointing information indicating the information on the public key is embedded, wherein the information on the public key or the pointing information is required for a digital content provider to receive digital money; and upon receipt of payment information created by a user terminal using (i) the public key associated with the digital content and (ii) a private key of the user terminal, and upon determination that the created payment information is valid, a play managing part embodied as one or more processors for supporting removal of a state of restriction on the use of the digital content to allow the user terminal to play the digital content;

wherein the payment information is created by digitally signing in use of the information on the private key of the user terminal after acquiring the information on the public key embedded in the digital content and information on digital money owned by a user who holds the user terminal;

wherein upon creation of the payment information, the user terminal broadcasts the payment information to multiple other terminals, and receives from the multiple other terminals information on verification as to whether the payment information is true or not; and wherein upon determination that the payment information is true from at least some of the multiple other terminals, a digital money transaction is allowed to be recorded in public database.

20. The content providing terminal of claim 19, wherein the digital content information managing part manages the information on the public key by embedding the information on the public key in the digital content in a form of watermark.

21. The content providing terminal of claim 19, wherein the user terminal includes a terminal for appreciation as one for playing the digital content and a terminal for payment as one for transmitting the payment information directly or indirectly to the content providing terminal.

22. The content providing terminal of claim 21, wherein, if the payment information created by using the information on the public key extracted by the terminal for appreciation is transmitted by the terminal for payment, the play managing part receives the payment information.

23. The content providing terminal of claim 21, wherein, on the condition that a wallet for digital money is installed at the terminal for appreciation and the digital money is deposited in the wallet, if a certain amount corresponding to the digital content among the digital money deposited in the wallet is transmitted to an address indicated by the information on the public key through control of the terminal for payment or the terminal for appreciation, the play managing part receives the payment information.

24. The content providing terminal of claim 21, wherein, if the terminal for payment requests the terminal for appreciation to transmit the payment information created by using the information on the public key extracted by the terminal for appreciation, the play managing part receives the payment information.

25. The content providing terminal of claim 21, wherein, if the information on the public key extracted by the terminal for appreciation is provided to the terminal for payment and the terminal for payment transmits the payment information directly or indirectly to an address, indicated by the information on the public key, which is set to be different from an address of the content providing terminal, a certain terminal, corresponding to the address indicated by the information on the public key, which receives the payment information, allows the payment information to be transmitted to the play managing part of the content providing terminal and accordingly the play managing part receives the payment information.

26. A user terminal for playing at least one technically protected digital content, comprising:

a metadata acquiring part embodied as one or more processors for acquiring information on the digital content in which (i) information on a public key or (ii) pointing information indicating the information on the public key is embedded, wherein the information on the public key or the pointing information is required to make a digital content provider receive digital money;

a payment information managing part embodied as one or more processors for creating payment information by using the public key and a private key of the user terminal;

upon determining that the payment information is true, a play managing part embodied as one or more processors for receiving a support to remove a state of restriction on the use of the digital content from a content providing terminal to thereby allow a user of the user terminal to play the digital content;

wherein the payment information is created by digitally signing in use of the information on the private key of the user terminal after acquiring the information on the public key embedded in the digital content and information on digital money owned by a user who holds the user terminal; and wherein upon creation of the payment information, the user terminal broadcasts the payment information to multiple other terminals, and receives from the multiple other terminals information on verification as to whether the payment information is true or not.

27. The user terminal of claim 26, wherein the payment information managing part creates the payment information by using the digital signature with the information on the private key of the user terminal and thereby creating a new digital money while the information on the public key extracted from the information embedded in the provided digital content is added to a hash value of the digital money owned by the user who holds the user terminal.

28. A content creating terminal for creating at least one digital content, comprising:
- a public key information inserting part embodied as one or more processors for embedding, in the digital content, (i) information on a public key or (ii) pointing information indicating the information on the public key, wherein the information on the public key or the pointing information is required for a digital content provider to receive digital money; and
- upon detecting from the user terminal that a specific condition has been satisfied relating to embedded information on a public key, a licensing part embodied as one or more processors for supporting removal of a state of restriction on the use of the digital content to allow the digital content to be played through a user terminal,
- wherein the digital content in which the information on the public key is embedded is acquired by the user terminal and payment information is created by digitally signing in use of the information on the private key of the user terminal after acquiring the information on the public key embedded in the digital content and information on digital money owned by a user who holds the user terminal; and
- wherein the specified condition includes a condition that the payment information is true;
- wherein upon creation of the payment information, the user terminal broadcasts the payment information to multiple other terminals, and receives from the multiple other terminals information on verification as to whether the payment information is true or not; and
- wherein upon determination that the payment information is true from at least some of the multiple other terminals, a digital money transaction is allowed to be recorded in public database.

* * * * *